Patented July 5, 1932

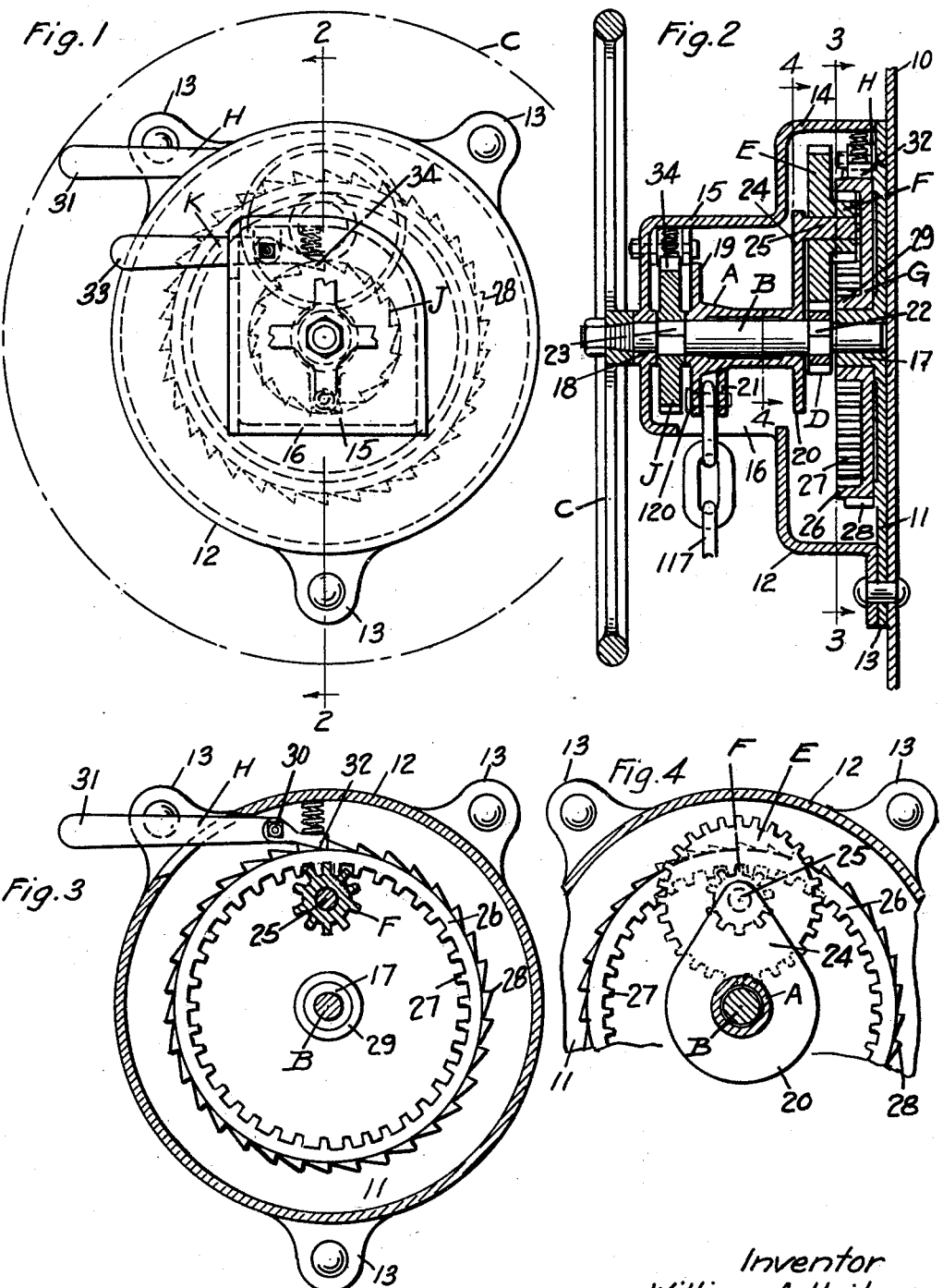

1,865,631

UNITED STATES PATENT OFFICE

WILLIAM A. HEITNER, OF CHICAGO, ILLINOIS, ASSIGNOR TO W. H. MINER, INC., OF CHICAGO, ILLINOIS, A CORPORATION OF DELAWARE

HAND BRAKE

Application filed August 28, 1930. Serial No. 478,319.

This invention relates to improvements in hand brakes.

One object of the invention is to provide a simple and efficient hand brake mechanism of the power multiplying type, especially adapted for railway cars, wherein a plurality of cooperating gear members are employed for effecting the power multiplication, and free running of the chain tightening member is had in releasing the brakes, without rotation of the actuating hand wheel and without disconnecting the power multiplying gears from each other, the required relative movement between the actuating means and the chain winding means in release being effected through planetary gear means including a rotary gear member on which the gear having planetary movement travels, the rotary gear member being locked against rotation during the brake tightening operation to establish the required operative driving relation between the actuating means and the chain winding means.

A more specific object of the invention is to provide a hand brake mechanism of the character indicated in the preceding paragraph, including a rotary chain winding drum, an operating hand wheel, a power multiplying gear means connecting the hand wheel and drum, including a driving gear rotatable with the hand wheel, a rotary gear eccentrically journaled on said drum and meshing with the driving gear and having planetary movement thereabout, a second planetary gear rotatable in unison with said first named planetary gear and having planetary movement therewith and meshing with internal teeth of a gear member coaxial with said drum and normally held against movement, but being releasable to permit free rotation thereof during release of the brakes to allow relative rotation of the drum and driving gear at that time, means being also provided to hold the hand wheel against rotation in chain unwinding direction to protect the brakeman against injury, and further prevent backward rotation of the chain winding drum when the gear having the internal teeth is held against rotation during the brake tightening operation.

Other objects of the invention will more clearly appear from the description and claims hereinafter following.

In the drawing, forming a part of this specification, Figure 1 is a front elevational view of my improved hand brake mechanism illustrating the same applied to the vertical end wall of a railway car, and showing the hand wheel and certain other parts of the mechanism in dotted lines. Figure 2 is a vertical, sectional view, corresponding substantially to the line 2—2 of Figure 1. Figure 3 is a vertical, sectional view in a plane parallel to the vertical end wall of the car and corresponding substantially to the line 3—3 of Figure 2. And Figure 4 is a sectional view similar to Figure 3, partly broken away, and corresponding substantially to the line 4—4 of Figure 2.

In carrying out my invention, I preferably enclose the operative parts of my improved hand brake mechanism within a housing secured to the vertical end wall of the railway car, which end wall is designated by 10. The housing is preferably made of two parts, comprising a rear section 11 and a front section 12. The rear section 11 is in the form of a substantially flat plate of the outline illustrated in Figure 1 and having three outstanding securing lugs or ears 13—13 thereon. The section 12 of the housing is in the form of a cover member enclosing the parts, and is provided with three outstanding lugs similar to the lugs 13 hereinbefore described and also designated by 13. The lugs 13 of the section 12 project outwardly therefrom and register with the lugs 13 of the plate-like member 11. The two sections of the housing may be secured together by any suitable means, rivets being shown which extend through the lugs 13 of the two sections and through the end wall of the car, thus serving to also fix the housing to the end wall. The housing section 12 has a portion 14 corresponding in outline and size to the main body portion of the plate 11, and also a reduced forwardly projecting portion 15 which forms a chamber or compartment of smaller size to house the chain winding drum of the mechanism. The housing portion 15 is open at the bottom, as indicated at 16, to accommodate the brake chain 117 for movement, the chain being connected to the brake mechanism proper, not shown, in a well known manner. The housing section 11 is provided with a central bearing member 17 in the form of inwardly projecting hollow sleeve-like section formed integral with said wall. The front wall of the section 12 of the housing is provided with a bearing opening 18 in alinement with the bearing member 17, said opening being suitably reinforced by external and internal flanges surrounding the same.

My improved hand brake mechanism proper comprises broadly a chain winding drum A; a drive shaft B; a hand wheel C; a driving gear D; a pair of planetary gears E and F; an internal gear or carrier member G; a locking dog H for the internal gear; a ratchet member J; and a ratchet locking dog K.

The chain winding drum A may be of any well known type, and as herein shown is provided with a substantially cylindrical chain winding portion having radially projecting flanges 19 and 20 at opposite ends thereof between which the chain 117 is guided while being wound on the drum. The brake chain 117 is connected to the chain winding drum by means of a pin or bolt 120 or any other well known securing means extending through the end link of the chain, the flange 19 of the drum and an outstanding lug 21 spaced from the flange 19 and formed integral with the drum. The drum A is rotatably supported on the supporting and operating shaft B, which has its opposite ends journaled in the bearing members 17 and 18 of the two housing sections. The central portion of the shaft B, on which the drum is mounted, is preferably cylindrical, as shown, to permit free rotation of the drum thereon. Inwardly of said cylindrical section of the shaft B, a portion of substantially square cross section 22 is provided on which the driving gear D is mounted, the driving gear being provided with a square opening in the hub thereof fitting said square section, so that the driving gear is fixed to the shaft B for rotation in unison therewith. The driving gear is preferably in the form of a small pinion member. Outwardly of the drum the shaft B is provided with another portion 23 which is also preferably of square cross section. The ratchet member J is secured to this end of the shaft, having a square opening in the hub thereof fitting the section 23. The shaft B projects outwardly of the housing and has the hand wheel C secured thereto, the projecting portion of the shaft being tapered, as shown, and of substantially square cross section and the hub of the hand wheel having an opening of corresponding cross section receiving said tapered square portion of the shaft. The hand wheel C may be secured in position by any suitable means, and as herein shown is held on the shaft by means of a securing nut threaded on the end thereof. The flange 20 of the chain winding drum, which is located at the inner end thereof, has an outstanding arm-like portion 24 formed integral therewith and said arm-like portion is provided with a stub shaft 25 formed integral therewith and laterally projecting therefrom. As will be evident, the stub shaft 25 provides a bearing member eccentric to the axis of rotation of the chain winding drum A.

The internal gear member G is in the form of a disc having a laterally projecting peripheral flange 26 provided with internal gear teeth 27 and external ratchet teeth 28. The disc portion of the gear member G has a laterally projecting hub section 29, which is journaled on the sleeve bearing member 17. The gear G is thus mounted for free rotation on the bearing member 17 about an axis coinciding with the axis of rotation of the chain winding drum. The locking dog H is pivotally supported on a pivot member 30 projecting from the rear wall of the housing and has an operating hand grip 31 at the outer end thereof and a tooth member 32 at the inner end cooperating with the ratchet teeth of the gear G. The tooth of the locking dog H is held yieldingly engaged with the teeth of the gear G by means of a spring interposed between the top wall of the housing and the extremity of the tooth of the dog.

The planetary gear members E and F are formed of a one piece casting, the gear E being of larger diameter than the gear F and the latter being rearwardly offset with respect to the former. The combined structure forming the gear members E and F is rotatably journaled on the stub shaft 25, whereby said gears E and F have both rotary movement about said stub shaft and bodily rotation about the axis of the chain winding drum A in unison with the latter. The larger gear E meshes directly with the driving gear D and the smaller gear F meshes with the internal gear teeth 27 of the gear G.

The ratchet locking dog K is pivotally supported on a pivot member projecting inwardly from the front wall of the housing and has an operating hand grip 33 at the outer end thereof and a tooth 34 at the inner end cooperating with the teeth of the ratchet member J. The toothed end of the locking dog K is held yieldingly engaged with the ratchet member J by means of a spring interposed between the top wall of the housing and the inner end of said locking dog. As will be evident, the locking dog K prevents rotation of the ratchet member J and the shaft B in a contra-clockwise direction, as viewed in Figure 1. The locking dog H which cooperates with the teeth of the internal gear G also prevents rotation of this member in a contra-clockwise direction, as viewed in Figure 1.

In applying the brakes, the hand wheel C is rotated in a clockwise direction, as viewed in Figure 1, thereby effecting rotation of the driving shaft B and the driving gear D in a similar direction. The rotary movement is communicated from the driving gear D to the planetary gear member E and the planetary gear member F, which meshes with the internal gear G. The rotary movement imparted to the planetary gears E and F being in a lefthand or contra-clockwise direction, the tendency will be for the gear F to rotate the internal gear G in a contra-clockwise direction also. Inasmuch as the gear G is locked against rotation in a contra-clockwise direction by the locking dog H, the planetary gears will be forced to travel in a clockwise direction about the axis of the shaft B, rolling on the internal teeth of the gear G. Inasmuch as the planetary gear F is mounted on the stub shaft 25, the drum A will be forced to rotate in a clockwise direction also, thereby winding the chain 17 thereon and tightening the brakes. During this operation, backward movement of the chain winding drum is prevented by the locking dog K which cooperates with the ratchet member J.

To release the brakes, the brakeman operates the locking dog H so as to disengage the same from the teeth of the gear G, thereby permitting free rotation of the gear G about the axis of the chain winding drum A. Immediate release of the brakes is thus provided, the chain winding drum A being free to rotate in a clockwise direction due to the gear G being unlocked. During the unwinding of the chain from the drum A, the planetary gear E will travel on the gear D, this planetary movement of the gears E and F, together with rotation on their axes being permitted by the free movement of the internal gear G with which the planetary gear F meshes.

As will be evident, during release of the brakes, the hand wheel and the shaft B will be positively held against backward movement by the locking dog K, thereby protecting the brakeman against injury by spinning of the hand wheel. In case it is found expedient to back up or ease off the brakes, the locking dog H is left in engagement with the ratchet teeth of the gear G while the ratchet locking dog K is disengaged from the ratchet member. As will be clear, the hand wheel may then be rotated in a contra-clockwise direction so as to permit rotation to the necessary extent of the chain winding drum, to ease off the brakes, the mechanism being at such a time under full control of the operator.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a chain winding drum; of a hand wheel; means for transmitting power from the hand wheel to the drum including a planetary gear means and a cooperating internal gear member on which said planetary gear means travels said internal gear member having ratchet teeth thereon; a lever actuated locking dog cooperating with said ratchet means for holding said gear member against rotary movement while the hand wheel is rotated to wind the chain on the drum, said locking means being releasable by actuation of said lever to free the dog from said ratchet teeth of said gear internal member to allow free rotation thereof and free unwinding movement of the chain winding drum with respect to the hand wheel; and a releasable locking dog for positively holding said hand wheel against rotation in an unwinding direction.

2. In a hand brake mechanism, the combination with a rotary chain winding drum; of actuating means including a drive gear rotatable about the axis of said drum; a rotary carrier coaxial with said drum and having internal gear teeth thereon; two planetary gear members of different diameter fixed to each other for rotation in unison and meshing with said driving gear and internal teeth of the carrier respectively, said planetary gear members being bodily rotatable about the axis of said drum in unison therewith; releasable means for normally locking said carrier against rotation; and releasable ratchet locking means for holding said actuating means against rotation during release of the brakes.

In witness that I claim the foregoing I have hereunto subscribed my name this 25th day of August 1930.

WILLIAM A. HEITNER.